United States Patent
Seki

[11] Patent Number: 5,992,921
[45] Date of Patent: Nov. 30, 1999

[54] VEHICLE BODY STRUCTURE

[75] Inventor: Ryoji Seki, Susono, Japan

[73] Assignee: Toyota Jidosha Kabushiki Kaisha, Toyota, Japan

[21] Appl. No.: 08/814,505

[22] Filed: Mar. 10, 1997

[30] Foreign Application Priority Data

Mar. 19, 1996 [JP] Japan ................................ 8-063528

[51] Int. Cl.⁶ .................................................. B60J 7/00
[52] U.S. Cl. .................. 296/188; 296/189; 296/203.01; 296/204; 296/209
[58] Field of Search ..................... 296/188, 189, 296/203.01, 204, 209, 29, 30

[56] References Cited

U.S. PATENT DOCUMENTS

| | | | |
|---|---|---|---|
| 3,940,176 | 2/1976 | Ito et al. | 296/188 |
| 4,129,330 | 12/1978 | Schwuchow | 296/204 |
| 4,557,519 | 12/1985 | Matsuura | 296/209 |
| 4,572,571 | 2/1986 | Malen | 296/204 |
| 4,892,350 | 1/1990 | Kijima | 296/188 |
| 5,100,189 | 3/1992 | Futamata et al. | 296/189 |
| 5,127,704 | 7/1992 | Komatsu | 296/204 |
| 5,354,115 | 10/1994 | Esaki | 296/188 |
| 5,614,194 | 3/1997 | Honma et al. | 296/204 |
| 5,806,918 | 9/1998 | Kanazawa | 296/30 |

FOREIGN PATENT DOCUMENTS

| | | |
|---|---|---|
| 54-3721 | 1/1979 | Japan . |
| 63-306985 | 12/1988 | Japan . |

*Primary Examiner*—Joseph D. Pape
*Assistant Examiner*—Kiran Patel
*Attorney, Agent, or Firm*—Pillsbury Madison & Sutro LLP

[57] ABSTRACT

A vehicle body structure in which load from a front of a vehicle, which load is applied to a front side member, is absorbed via a reinforcing member fixed to a floor panel and extending in a longitudinal direction of the vehicle. The reinforcing member is provided so as to be inclined, with respect to the longitudinal direction of the vehicle, toward a side sill provided at a vehicle transverse outer side of the reinforcing member, and is provided such that, when a load is applied, the reinforcing member is slidable toward a rear of the vehicle with a rear end portion of the reinforcing member contacting the side sill.

11 Claims, 17 Drawing Sheets

F I G. 4
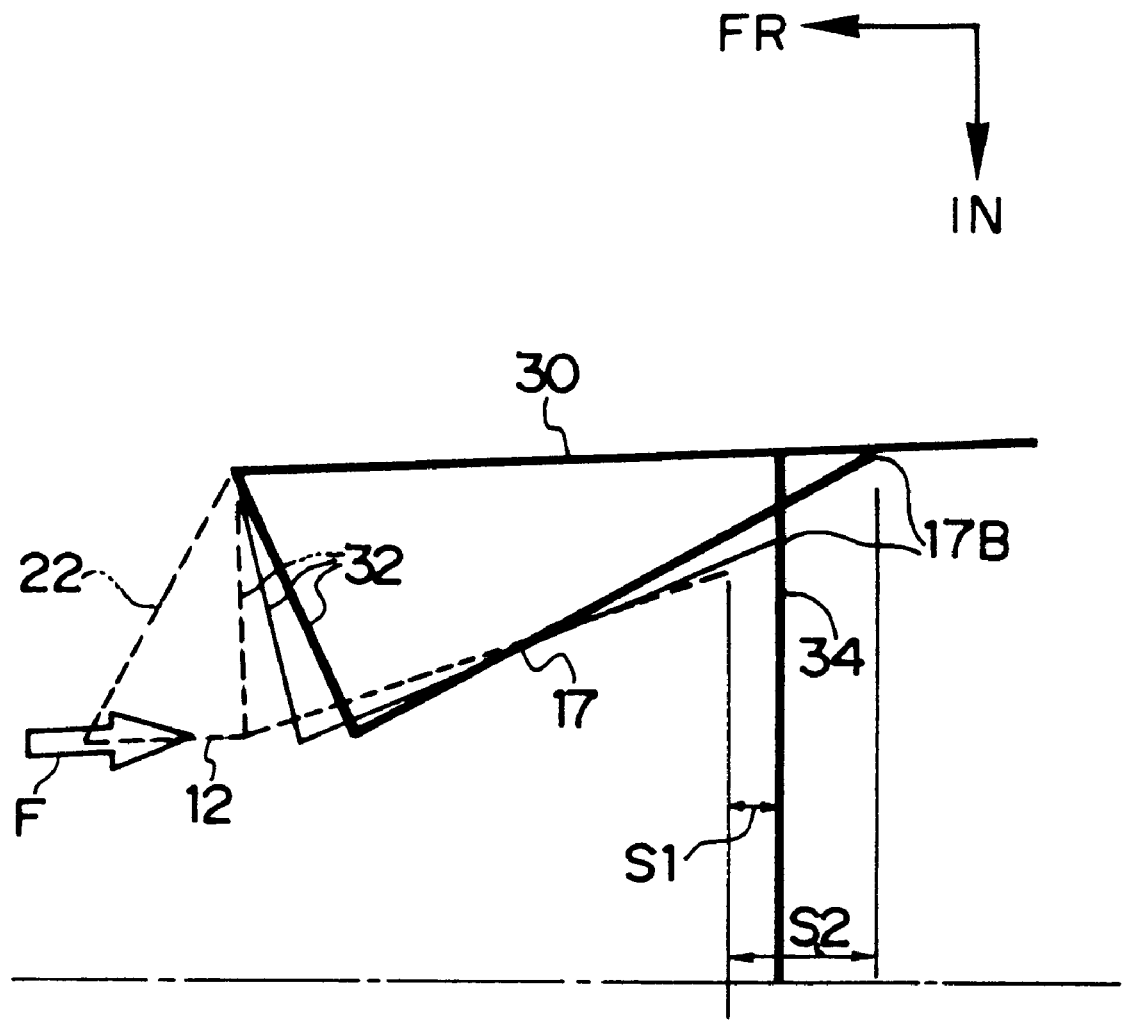

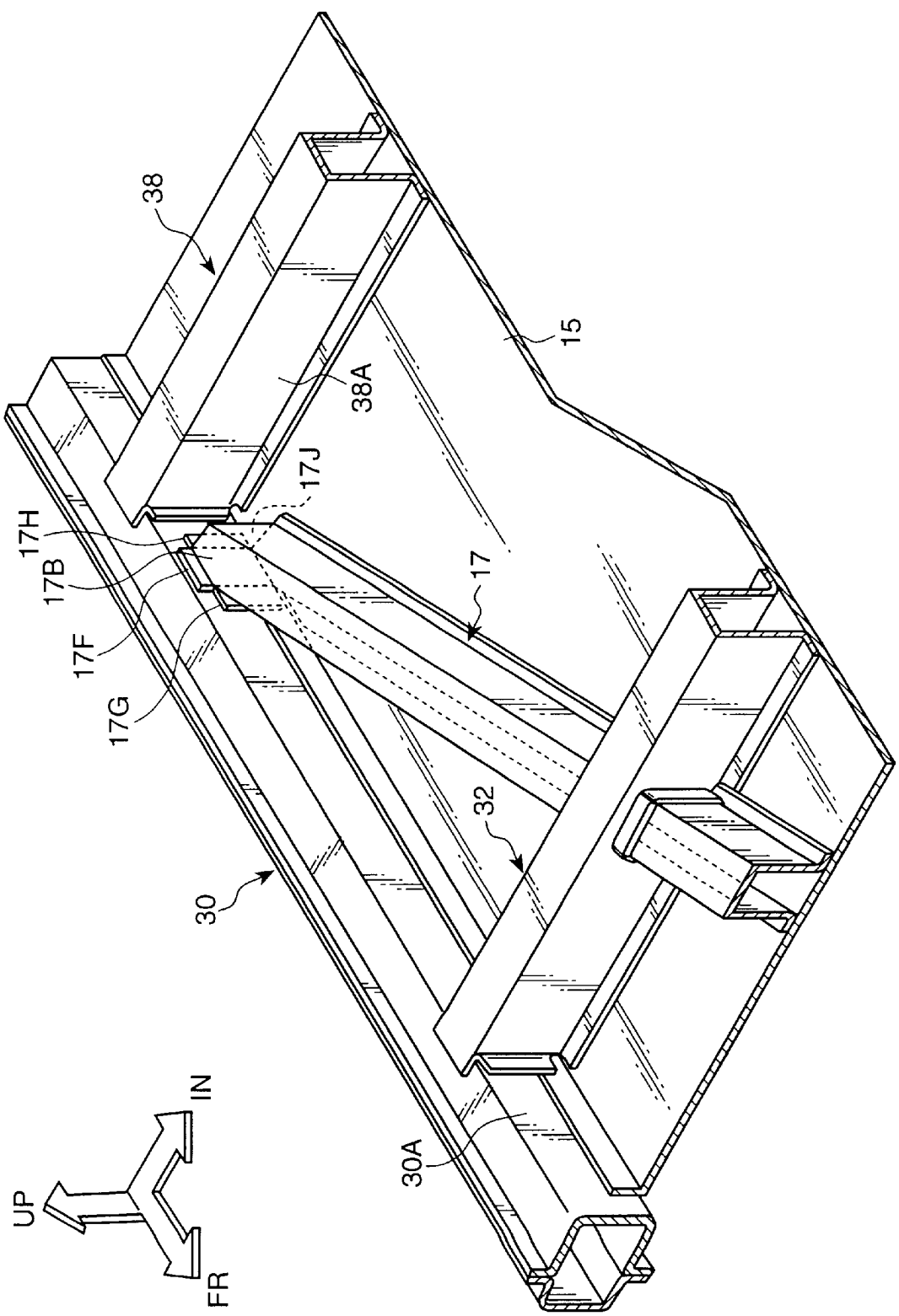
F I G. 14

VEHICLE BODY STRUCTURE

BACKGROUND OF THE INVENTION

1. Field of the Invention

The present invention relates to a vehicle body structure, and more specifically, it relates to a vehicle body structure such as an automobile equipped with a front side member in the front portion of the vehicle body.

2. Description of the Related Art

Heretofore, as a vehicle body structure such as an automobile equipped with a front side member in the front portion of the vehicle body, a front portion longitudinal member, in which a load applied to the front portion longitudinal member is absorbed by a plurality of arms and which is supported in a curving state on a cowl of a frame-free body of the car, has been disclosed in Japanese Patent Application Laid-Open (JP-A) No. 54-3721, and furthermore, another the vehicle body structure has been disclosed in Japanese Patent Application Laid-Open (JP-A) No. 63-306985. The body structure in Japanese Patent Application Laid-Open (JP-A) No. 63-306985 will be described hereinafter.

As shown in FIG. 17, in this vehicle body structure, a front side member (which may also be called a front side frame) 70 is connected to a front pillar (which may also be called a hinge pillar) 78 via torque boxes 74, 76 formed on the vehicle front side of a dash lower panel 72, and the rear end portion of the front side member 70 is connected to a side sill 82 via a floor frame 80. Therefore, an impact force applied onto the front side member 70 can be dispersed to skeletal members such as the front pillar 78 and the side sill 82.

However, in this vehicle body structure, the impact force applied to the front side member 70 is transmitted to the side sill 82 via the floor frame 80, but during this transmission, the impact force is scarcely absorbed, and thus the absorption amount of the impact force is small.

SUMMARY OF THE INVENTION

In view of the aforementioned facts relating to the present invention, an object of the present invention is to provide a vehicle body structure in which the absorption amount of an impact force applied to a front side member can be increased.

A first aspect of the present invention is directed to a vehicle body structure in which load from a front of a vehicle, which load is applied to a front side member, is absorbed via a reinforcing member fixed to a floor panel and extending in a longitudinal direction of the vehicle, wherein the reinforcing member is provided so as to be included, with respect to the longitudinal direction of the vehicle, toward a side sill provided at a vehicle transverse direction outer side of the reinforcing member, and is provided such that, when a load is applied, the reinforcing member is slidable toward a rear of the vehicle with a rear end portion of the reinforcing member contacting the side sill.

Therefore, when the impact force is applied from the front of the car, the rear end portion of the reinforcing member can slide toward the vehicle rear to the side sill by a deformation force toward a vehicle rear outside. Therefore, the body structure of the present invention has an excellent effect that the absorption of the impact force applied to the front side member can be increased.

A second aspect of the present invention is directed to a vehicle body structure in which load from a front of a vehicle, which load is applied to a front side member, is absorbed via a reinforcing member fixed to a floor panel and extending in a longitudinal direction of the vehicle according to the first aspect of the present invention wherein the rear end portion of the reinforcing member is provided so as to be separated from the side sill at a predetermined distance.

Therefore, if the impact force is applied from the front of the vehicle, the rear end portion of the reinforcing member can first move toward the side sill by the deformation force toward the vehicle rear outside, and after it has come in contact with the side sill, it can then slide toward the rear of the vehicle to the side sill. In consequence, the body structure of the present invention has an excellent effect that the absorption of the impact force applied to the front side member can further be increased.

A third aspect of the present invention is directed to a vehicle body structure in which load from a front of a vehicle, which load is applied to a front side member, is absorbed via a reinforcing member fixed to a floor panel and extending in a longitudinal direction of the vehicle according to the first aspect of the present invention wherein the side sill is two side sills which are provided in vicinities of respective transverse direction end portions of the vehicle, and the vehicle body structure further comprises a front floor cross member which connects the side sills, the front floor cross member being provided at a vehicle rear side of the reinforcing member, and the reinforcing member being provided such that an imaginary extended line, which extends from the reinforcing member toward a rear of the vehicle along an axial direction of the reinforcing member, intersects the front floor cross member and the side sills.

Therefore, if the impact force is applied from the front of the vehicle, the reinforcing member can deform the front floor cross member by the deformation force toward the vehicle rear outside, and can then come in contact with the side sill. Afterward, the reinforcing member can slide toward the rear of the vehicle to the side sill. In consequence, the body structure of the present invention has an excellent effect that the absorption of the impact force applied to the front side member can further be increased.

A fourth aspect of the present invention is directed to a vehicle body structure in which load from a front of a vehicle, which load is applied to a front side member, is absorbed via a reinforcing member fixed to a floor panel and extending in a longitudinal direction of the vehicle according to the first aspect of the present invention wherein side sill is two side sills which are provided in vicinities of respective transverse direction end portions of the vehicle, and the vehicle body structure further comprises a front floor cross member which connects the side sills, the reinforcing member passes through the front floor cross member, and the reinforcing member being provided such that an imaginary extended line, which extends from the reinforcing member toward a rear of the vehicle along an axial direction of the reinforcing member, intersects the side sills.

Therefore, if the impact force is applied from the front of the vehicle, the reinforcing member can move toward the vehicle rear outside to the front floor cross member by the deformation force toward the vehicle rear outside, and can then come in contact with the side sill. Afterward, the reinforcing member can slide toward the vehicle rear to the side sill. In consequence, the body structure of the present invention has an excellent effect that the absorption of the impact force applied to the front side member can further be increased.

BRIEF DESCRIPTION OF THE DRAWINGS

FIG. 4 is an operational view for explaining the vehicle body structure relating to the first embodiment of the present invention.

FIG. 14 is a plan view showing the vehicle body structure relating to a modified example of the third embodiment of the present invention as seen from interior of the rear portion of the vehicle and at a diagonal.

DESCRIPTION OF THE PREFERRED EMBODIMENT

Figure 1:
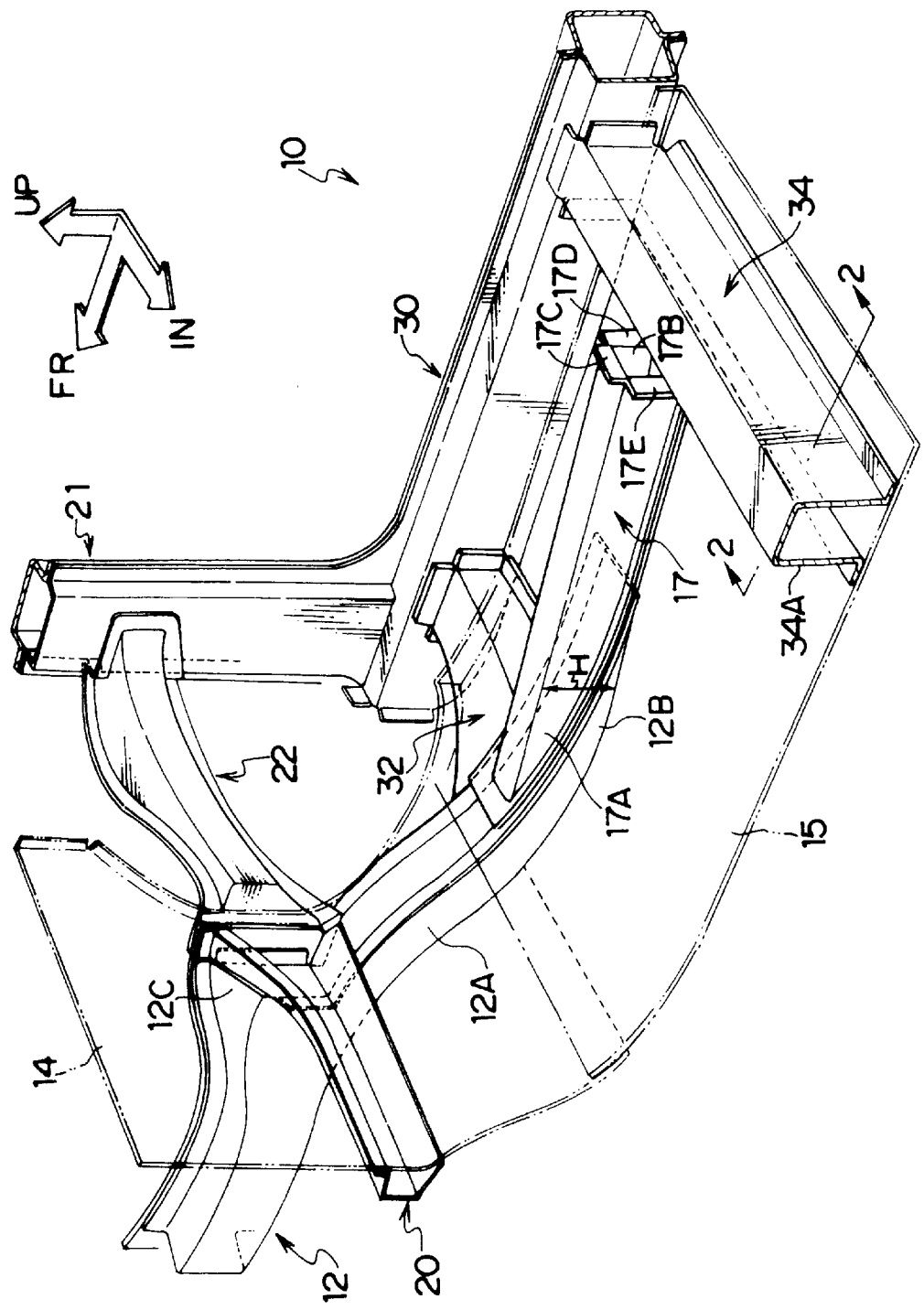
FIG. 1 is a perspective view showing a vehicle body structure relating to the first embodiment of the present invention as seen from interior of the rear portion of the vehicle and at a diagonal.

The first embodiment of a vehicle body structure according to the present invention will be described with reference to FIGS. 1 to 4.

In the drawings, an arrow FR denotes a front direction of the vehicle, an arrow UP denotes an upward direction of the vehicle, and an arrow IN denotes a transverse inner direction of the vehicle.

As shown in FIG. 1, in a body 10 of an automobile of the first embodiment, a pair of right and left front side members 12 are arranged along a vehicle longitudinal direction in the vicinity of both the lower end portions in a vehicle transverse direction of a vehicle front portion (the front side member 12 on the left side of the vehicle is not shown). These front side members 12 have a closed cross-sectional structure extending in the longitudinal direction of the vehicle, and the vehicle rear end portion of the front side members 12 is fixed to a dash lower panel 14 for dividing the engine room from the vehicle occupant compartment.

Furthermore, in the vehicle rear end portion of the front side members 12, an inclined portion 12A is extended toward a vehicle lower rear side along the surface of the dash lower panel 14, and the lower end portion of this inclined portion 12A is constituted of a horizontal portion 12B obliquely extending to the vehicle rear outside. The height of the horizontal portion 12B gradually decreases toward the vehicle rear, and on the horizontal portion 12B, an under reinforce 17 as a reinforced member is mounted with the interposition of a floor panel 15. The height of a front portion 17A of the under reinforce 17 gradually decreases toward the front of the vehicle, and a height H, in the vertical direction of the vehicle, of the superposing portion of the horizontal portion 12B of the front side member 12 and the front portion 17A of the under reinforce 17 is substantially constant at any position in the longitudinal direction of the vehicle.

Further, the sections of the inclined portion 12A and the horizontal portion 12B of the front side member 12 as seen from its longitudinal direction have a substantially U-shaped form, and the openings of these portions face to the surface of the dash lower panel 14 and the surface of the floor panel 15, respectively. Right and left flanges formed at the end portions of the openings are fixed to the dash lower panel 14 and the floor panel 15, respectively. Furthermore, the under reinforce 17 has a substantially U-shaped form as seen from its longitudinal direction and its opening faces to the surface of the floor panel 15, and right and left flanges formed at the end portion of the opening are fixed to the floor panel 15, respectively.

Accordingly, by the fixing of the horizontal portion 12B of the front side member 12 and the floor panel 15, a closed cross-sectional portion extending to the rear and the transverse outside direction of the vehicle in a plan view is formed, and by the fixing of the under reinforce 17 and the floor panel 15, a closed sectional portion extending to the rear and the transverse outside direction of the vehicle in the plan view is formed, and these closed sectional portions continuously extend to the rear of the vehicle.

A dash cross member 20 is provided on an intermediate portion 12C continuously connected to the upper end portion of the inclined portion 12A of each of the right and left front side members 12. The section of the dash cross member 20 has a substantially U-shaped form as seen from its longitudinal direction, and its opening faces to the rear of the vehicle. Upper and lower flanges formed at the end portion of the opening are fixed to the dash lower panel 14, respectively. Therefore, by the fixing of the dash cross member 20 and the dash lower panel 14, there is formed a closed cross-sectional portion for mutually connecting the front side members 12 arranged on the right and left sides of the vehicle (the front side member 12 on the left side of the vehicle is not shown).

Between the intermediate portion 12C of the right and left front side members 12 and a front pillar 21, a pillar brace 22 is arranged substantially in a parallel with the transverse direction of the vehicle, and the pillar brace 22 connects the intermediate portion 12C of the front side members 12 to the front pillar 21.

A torque box 32 is disposed between the front end portion of a side sill 30 fixed to the lower end portion of the front pillar 21 and the front portion 17A of the under reinforce 17. The cross-sectional configuration of the torque box 32 as seen from the transverse direction of the vehicle is a substantially U-shaped form whose opening is directed downward. Front and rear flanges formed at the end portion of the opening are fixed to the floor panel 15, respectively. Therefore, the torque box 32 fixed to the floor panel 15 defines a closed cross-sectional portion for connecting the front end portion of the side sill 30 to the front portion 17A of the under reinforce 17.

Between the side sills 30 arranged on the right and left sides of the vehicle (the front side on the left side of the vehicle is not shown), a front floor cross member 34 is disposed along the transverse direction of the vehicle. The cross-sectional configuration of the front floor cross member 34 as seen from the transverse direction of the vehicle is a substantially U-shaped form whose opening is directed downward. Front and rear flanges formed at the end portion of the opening are fixed to the floor panel 15, respectively. Therefore, the front floor cross member 34 fixed to the floor panel 15 defines a closed cross-sectional portion for connecting the side sills 30 arranged on the right and left sides of the vehicle.

Figure 2:
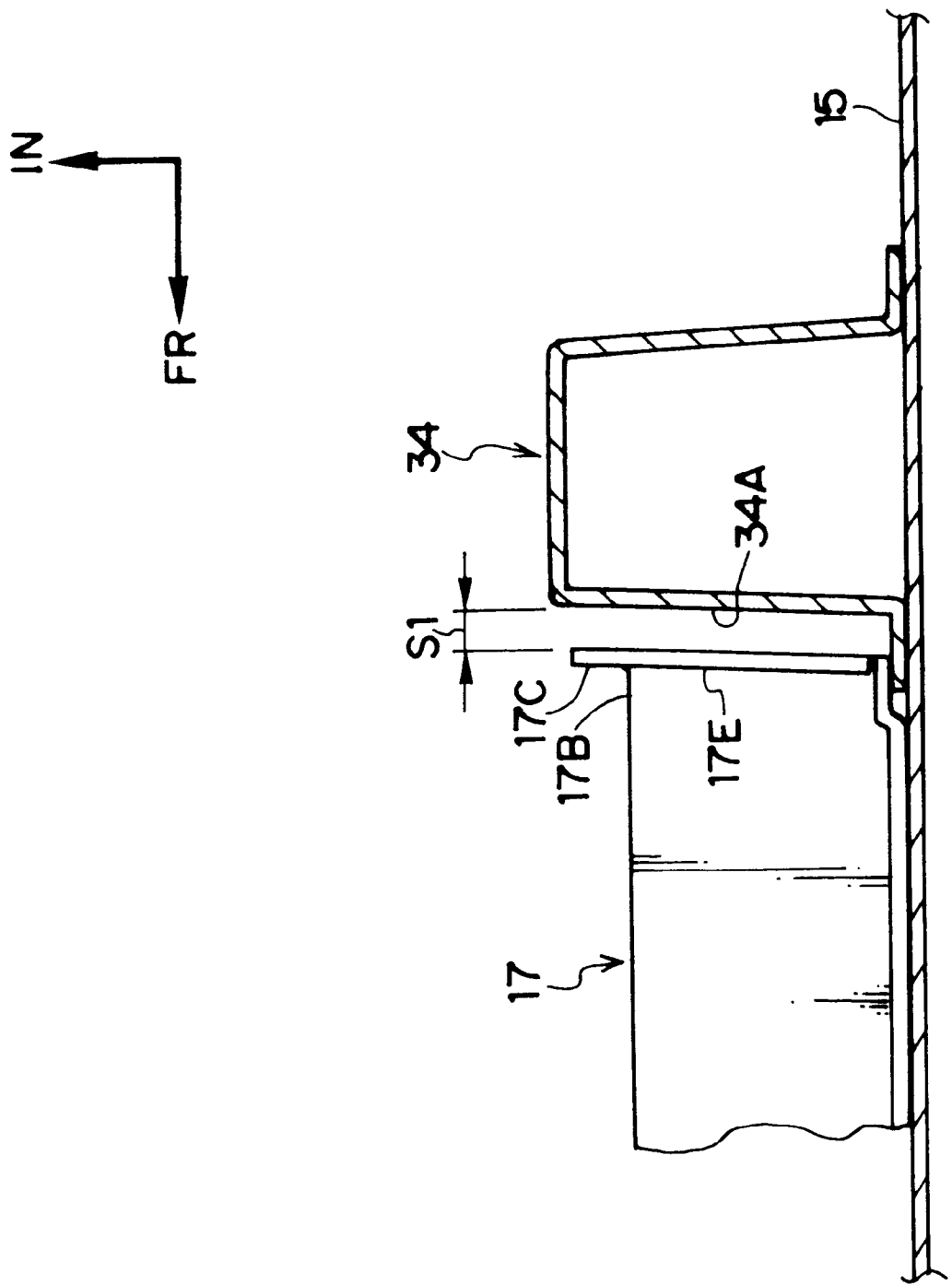
FIG. 2 is a sectional view taken along line 2—2 of FIG. 1.

As shown in FIG. 2, a rear portion 17A of the under reinforce 17 is arranged with a space of a distance S1 between the under reinforce 17 and the front floor cross member 34.

As shown in FIG. 1, around the rear end portion 17B of the under reinforce 17, an upper flange 17C, an outer flange 17D and an inner flange 17E are formed, facing to a front wall portion 34A of the front floor cross member 34.

Figure 3:
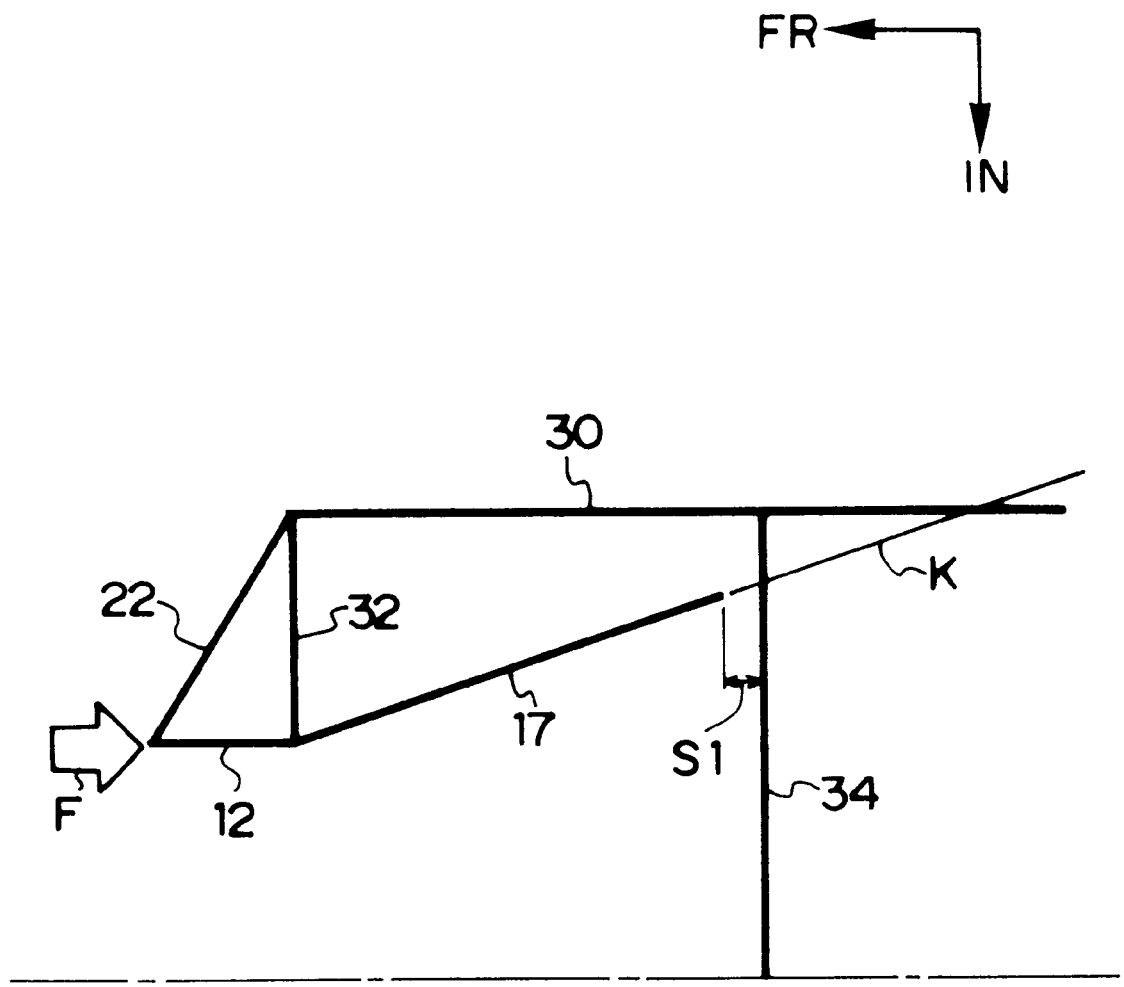
FIG. 3 is a schematic plan view showing the vehicle body structure relating to the first embodiment of the present invention.

Therefore, in the vehicle body structure in this first embodiment, the front side members 12, the under reinforce 17, the dash cross member 20, the pillar brace 22, the side sills 30, the torque box 32 and the front floor cross member 34 are arranged as shown in a schematic plan view of FIG. 3, and an imaginary extended line K, which extends from the under reinforce 17 rearwardly in the axial direction of the under reinforce 17, crosses the front floor cross member 34 and the side sill 30.

Next, the operation of the first embodiment will be described.

As shown in FIG. 3, in this first embodiment, when an impact force (an arrow F in FIG. 3) is applied to the front side members 12 toward the rear of the vehicle at the time of a collision, the under reinforce 17 is pushed by the front side members 12, and the under reinforce 17 is deformed toward the rear of the vehicle and outwardly in the transverse direction of the vehicle from the position of a dotted line to the position of a thin solid line in FIG. 4 (the deformation amount toward the rear of the vehicle is S1). In addition, the rear end portion 17B of the under reinforce 17 abuts against the front floor cross member 34, and the rear end portion 17B is supported by the front floor cross member 34.

In a case in which the input load F at the time of a collision is even greater, the front floor cross member 34 is deformed toward the rear of the vehicle by the rear end portion 17B of the under reinforce 17, so that the under reinforce 17 is deformed from the position of a dotted line to the position of a thick solid line in FIG. 4 (the deformation amount toward the rear of the vehicle is S2), and the rear end portion 17B abuts the side sill 30 and is supported by the side sill 30. Afterward, the rear end portion 17B of the under reinforce 17 slides toward the rear of the vehicle while contacting the side sill 30.

Therefore, in the vehicle body structure in this first embodiment, the amount of absorption of the impact force applied to the front side members 12 can be increased.

In addition, in this first embodiment, the rigidity of the supporting of the front floor cross member 34 to the under reinforce 17 and the rigidity of the supporting of the side sill 30 to the under reinforce 17 can be regulated to easily control the deformation amount of the vehicle body and a generated load (a generated yield strength). Further, this effect is particularly effective for short overhang automobiles.

Figure 5:
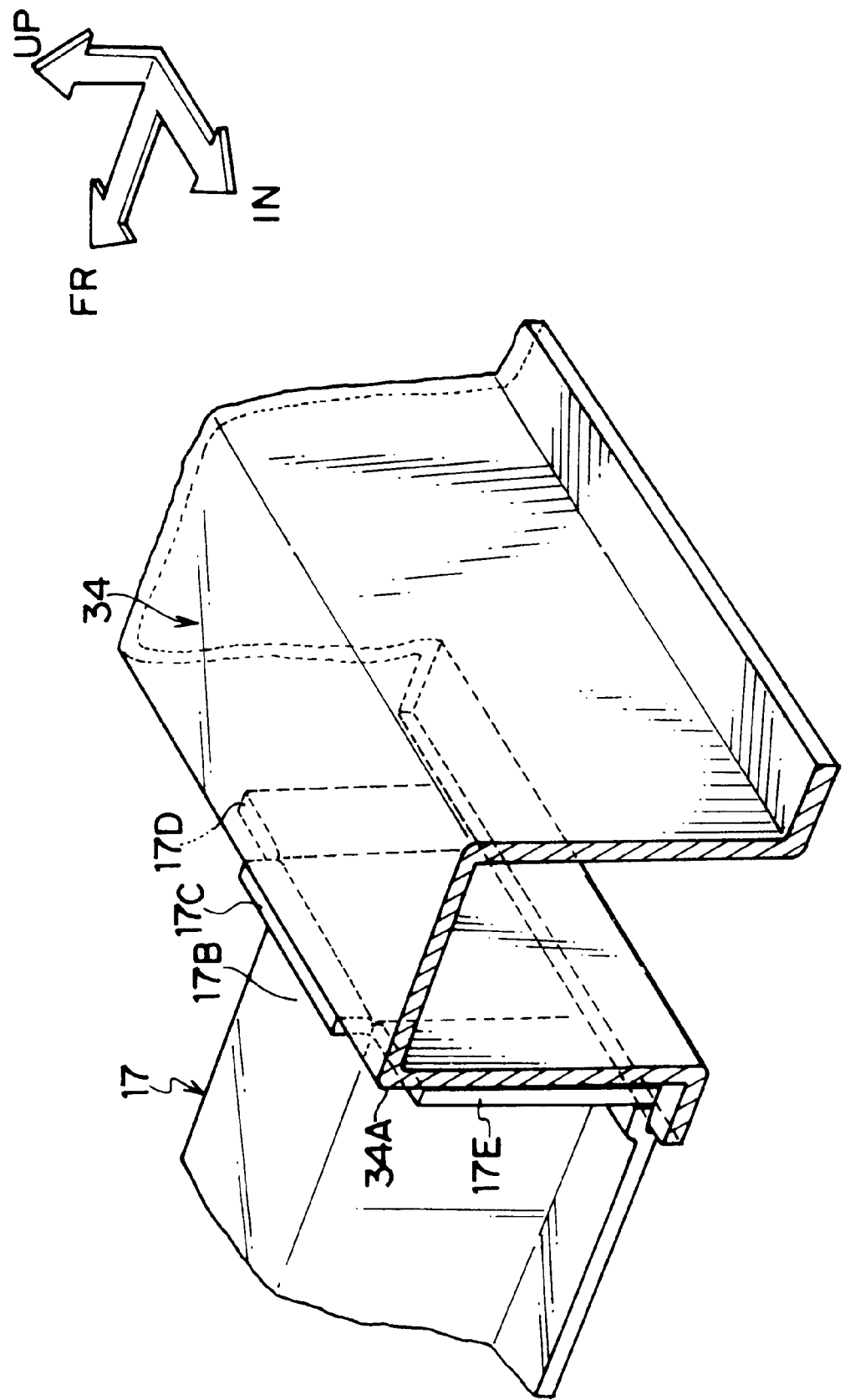
FIG. 5 is a perspective view showing a part of the vehicle body structure relating to a modified example of the first embodiment of the present invention as seen from interior of the rear portion of the vehicle and at a diagonal.

In this first embodiment, the rear end portion 17B of the under reinforce 17 may be disposed with a space of the distance S1 between the under reinforce 17 and the front floor cross member 34, or as shown in FIG. 5, the rear end portion 17B of the under reinforce 17 may abut the front floor cross member 34. In the latter case, the rear end portion 17B of the under reinforce 17 is not fixed rigidly to the front floor cross member 34.

Next, the second embodiment of a vehicle body structure according to the present invention will be described with reference to FIGS. 6 to 8.

The same members as in the first embodiment will be represented by the same numerals, and description of these members will be omitted.

Figure 6:
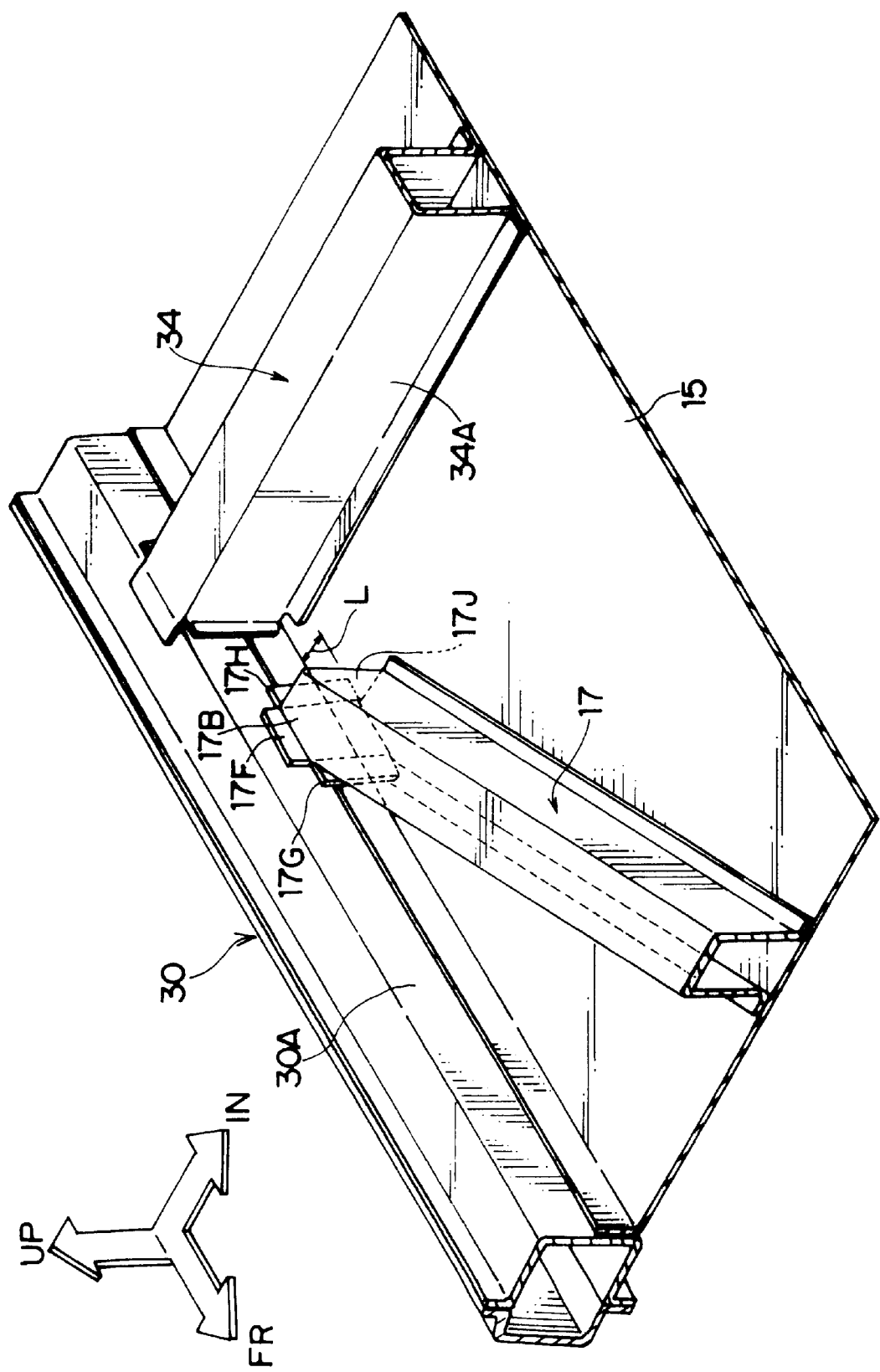
FIG. 6 is a perspective view showing the vehicle body structure relating to the second embodiment of the present invention as seen from interior of the rear portion of the vehicle and at a diagonal.

As shown in FIG. 6, in the second embodiment, with regard to an under reinforce 17, its rear end portion 17B is arranged so as to take a space of a distance L between the rear end portion 17B and a side sill 30, and around the rear end portion 17B, an upper flange 17F, a front flange 17G and a rear flange 17E are formed, facing to a vehicle transverse direction inner wall portion 30A of the side sill 30. Furthermore, the rear end portion 17B of the under reinforce 17 is provided with a vertical wall portion 17J which faces to a front wall portion 34A of a front floor cross member 34.

Figure 7:
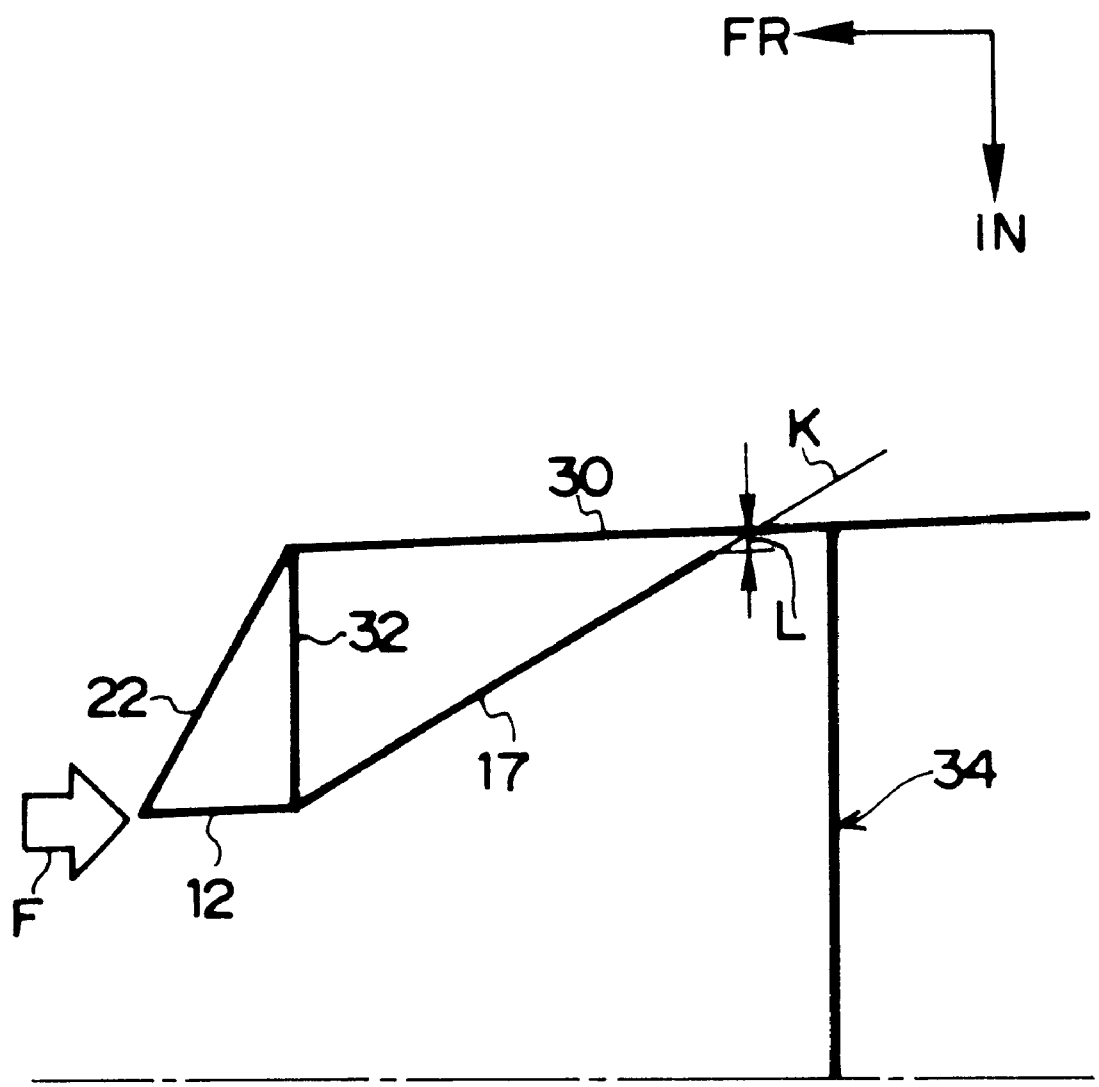
FIG. 7 is a schematic plan view showing the vehicle body structure regarding the second embodiment of the present invention.

Therefore, in the vehicle body structure in this second embodiment, the front side members 12, the under reinforce 17, the pillar brace 22, the side sills 30, the torque box 32 and the front floor cross member 34 are arranged as shown in FIG. 7, and an imaginary extended line K, which extends from the under reinforce 17 rearwardly in the axial direction of the under reinforce 17.

Next, the operation of the second embodiment of the present invention will be described.

Figure 8:
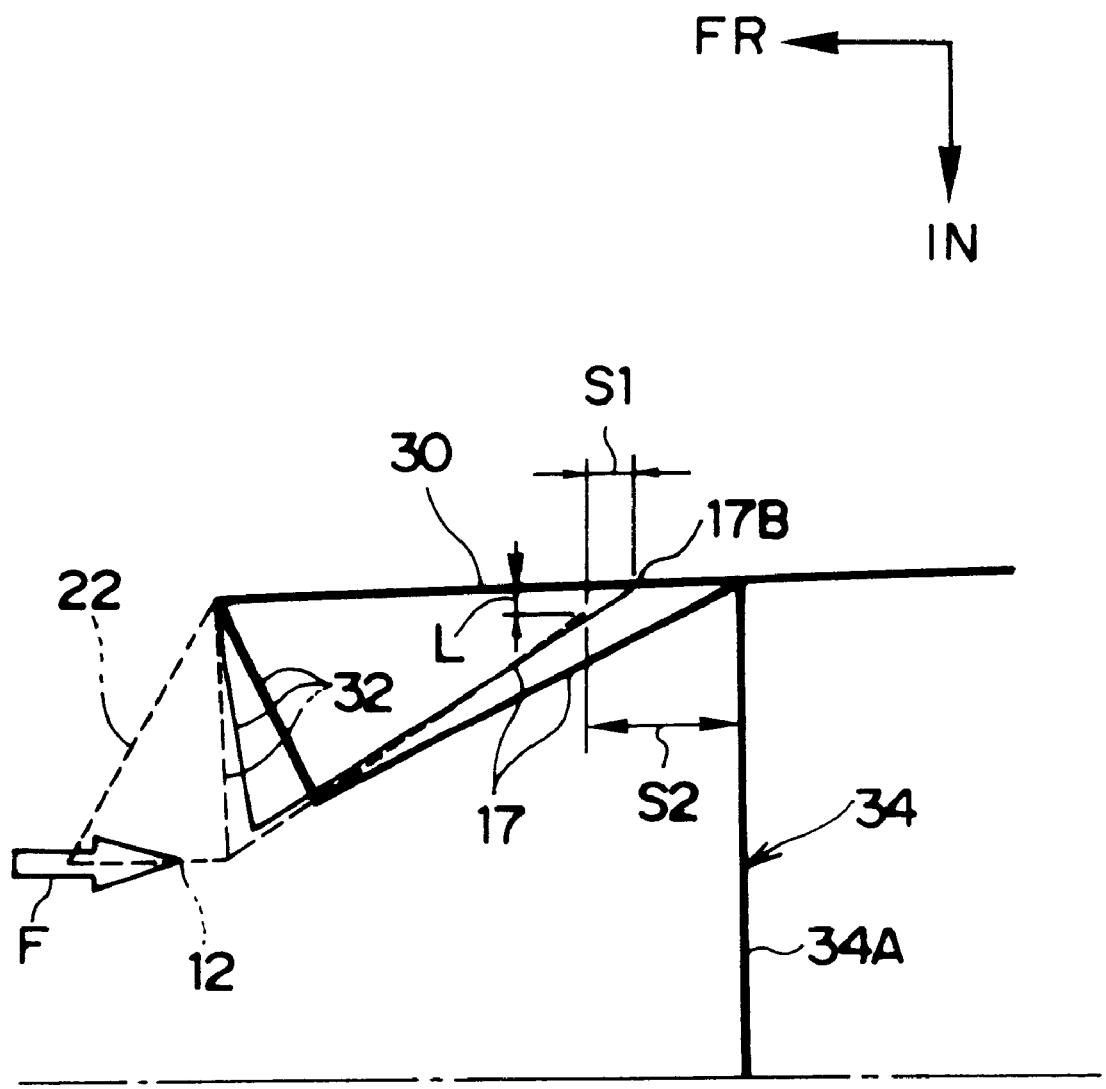
FIG. 8 is an operational view for explaining the vehicle body structure relating to the second embodiment of the present invention.

As shown in FIG. 7, in this second embodiment, when an impact force (an arrow F in FIG. 7) is applied to the front side members 12 toward the rear of the vehicle at the time of a collision, the under reinforce 17 is pushed by the front side members 12, so that it is deformed toward the rear of the vehicle and outwardly in the transverse direction of the vehicle from the position of a broken line to the position of a thin solid line in FIG. 8 (the deformation amount toward the rear of the vehicle is S1). In addition, the rear end portion 17B of the under reinforce 17 abut the side sill 30, and supported by the side sill 30.

In the case that an input load F at the time of the collision is further large, the rear end portion 17B of the under reinforce 17 slides toward the rear of the vehicle, while abutting the vehicle transverse direction inner wall portion 30A of the side sill 30, so that the under reinforce 17 is deformed from the position of a broken line to the position of a thick solid line in FIG. 8 (the deformation amount toward the rear of the vehicle is S2). At this time, the vertical wall portion 17J of the rear end portion 17B (see FIG. 6) abuts the front wall portion 34A of the front floor cross member 34 and supported by the front wall portion 34A. In consequence, the absorption of the impact force applied to the front side members 12 can be increased.

Furthermore, in the second embodiment, the rigidity of the supporting of the front floor cross member 34 to the under reinforce 17 and the rigidity of the supporting of the side sill 30 to the under reinforce 17 can be regulated to easily control the deformation amount of the vehicle body and a generated load (a generated yield strength). Further, this effect is particularly effective for short overhang automobiles.

Figure 9:
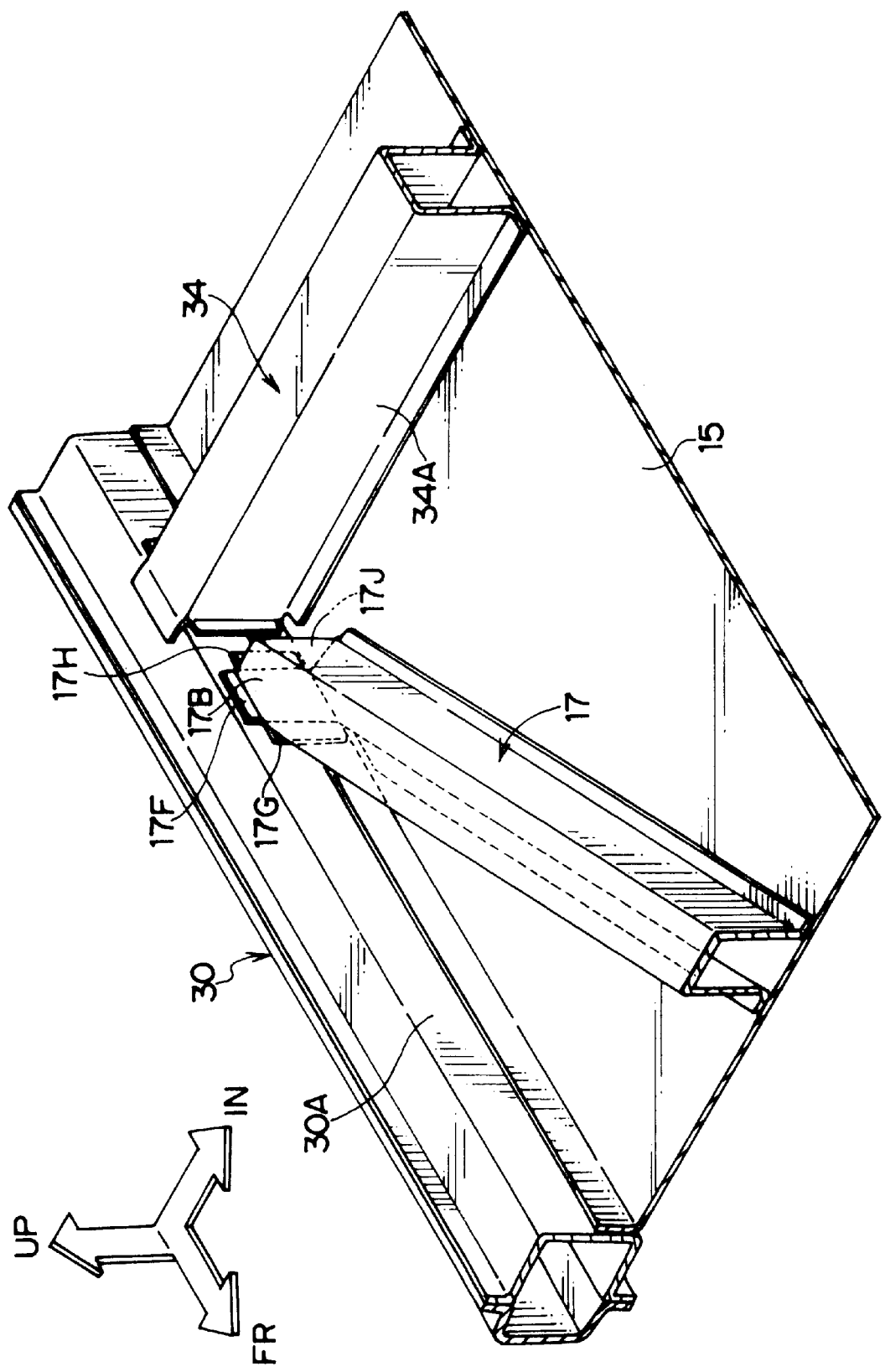
FIG. 9 is a perspective view showing the vehicle body structure relating to a modified example of the second embodiment of the present invention as seen from interior of the rear portion of the vehicle and at a diagonal.

Moreover, in the second embodiment, the rear end portion 17B of the under reinforce 17 may be disposed with a space of the distance L between the rear end portion 17B and the side sill 30, or the rear end portion 17B of the under reinforce 17 may abut the vehicle transverse direction inner wall portion 30A of the side sill 30, as shown in FIG. 9. In this latter case, the rear end portion 17B of the under reinforce 17 is not fixed ridigly to the vehicle transverse direction inner wall portion 30A of the side sill 30.

Figure 10:
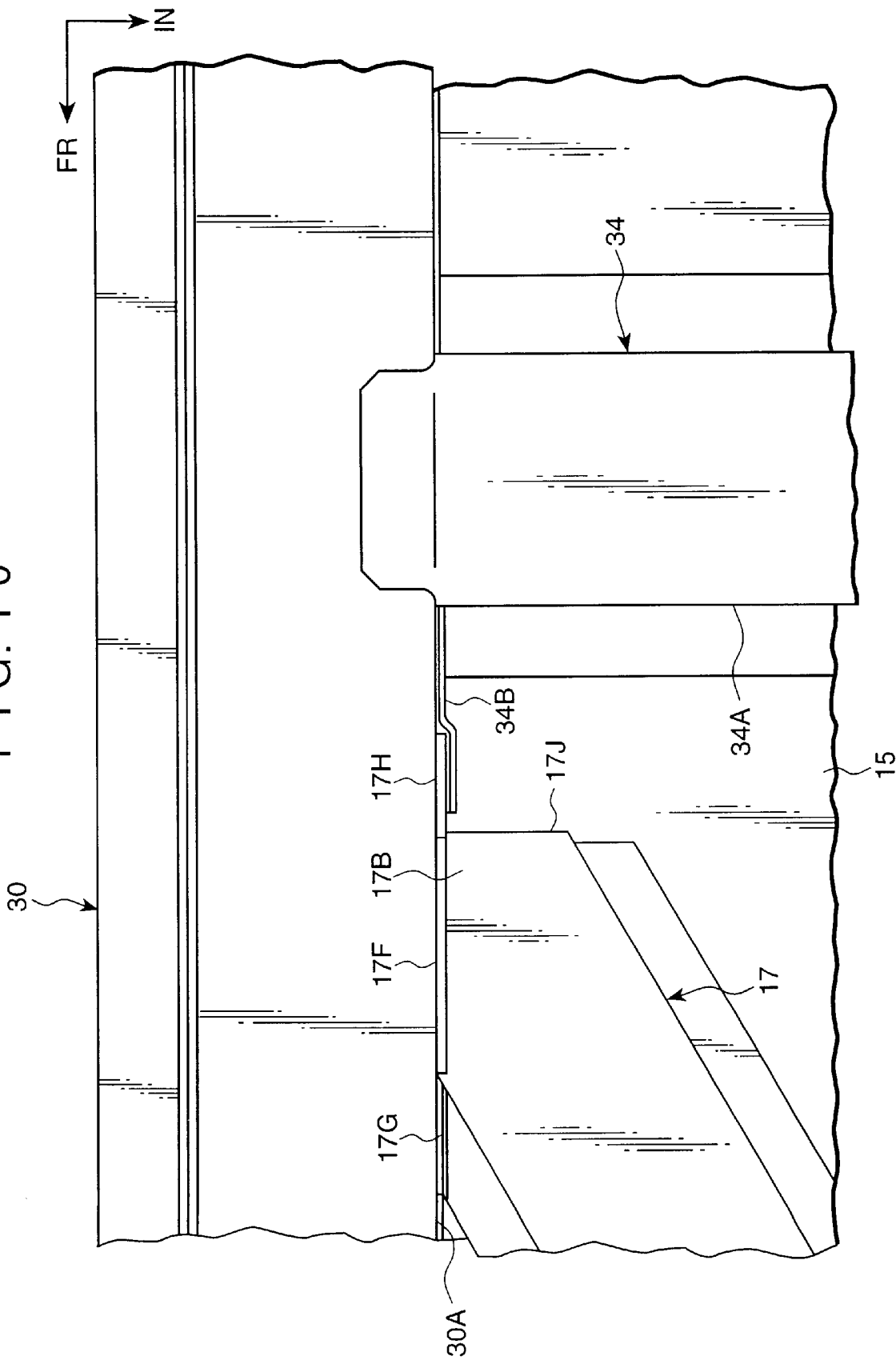
FIG. 10 is a plan view showing the vehicle body structure relating to another modified example of the second embodiment of the present invention.

Furthermore, as shown in FIG. 10, a front flange 34B may be provided at the vehicle transverse direction outer end portion of the front wall portion 34A of the front floor cross member 34. The front flange 34B is formed so as to extend toward the front of the vehicle, is superposed on and fixed to a rear flange 17H of the under reinforce 17 from the vehicle transverse direction inner side of the rear flange 17H. In this case, the under reinforce 17 and the front floor cross member 34 are fixed to each other by the spot welding of the flange 17H and the flange 34B, whereby a larger deformation strength can be obtained at the time of the deformation. In addition, the rear flange 17H of the under reinforce 17, the front flange 34B of the front floor cross member 34 and the side sill 30 are subjected to the spot welding, whereby the number of weld points can be reduced as compared with a case in which the rear flange 17H and the side sill 30 are spot welded, and the front flange 34B and the side sill 30 are spot welded.

Next, the third embodiment of a vehicle body structure according to the present invention will be described with reference to FIGS. 11 to 13.

The same members as in the second embodiment will be represented by the same numerals, and description of these members will be omitted.

Figure 11:
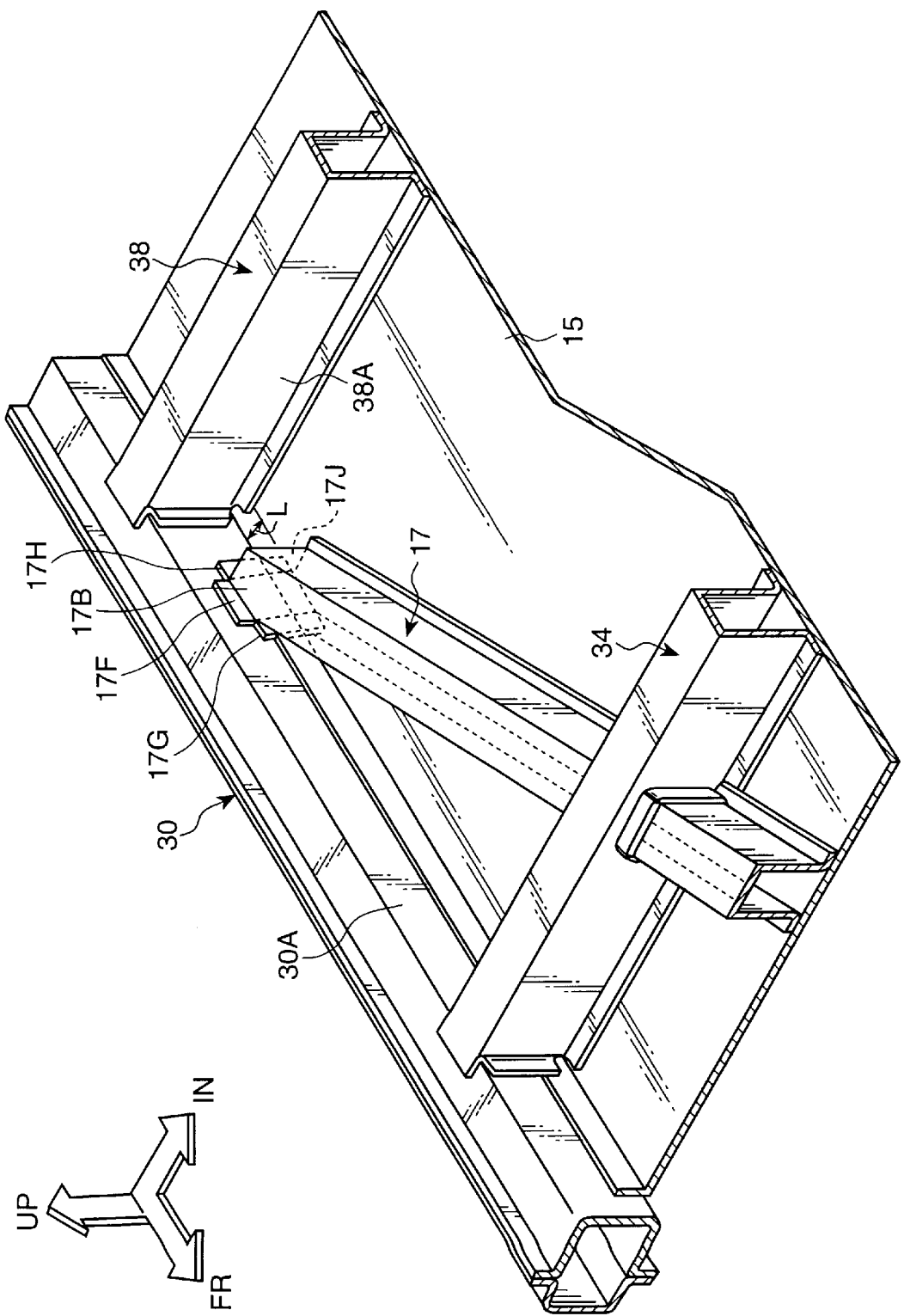
FIG. 11 is a perspective view showing the vehicle body structure relating to the third embodiment of the present invention as seen from interior of the rear portion of the vehicle and at a diagonal.

As shown in FIG. 11, in the third embodiment, the under reinforce 17 is disposed so as to pass through a front floor cross member 34, and a rear end portion 17B of the under reinforce 17 is disposed with a space of a distance L between the rear end portion 17B and a side sill 30. In addition, an upper flange 17F, a front flange 17G and a rear flange 17E are formed at the periphery of the rear end portion 17B so as to oppose a vehicle transverse direction inner wall portion 30A of the side sill 30. Furthermore, the rear end portion 17B of the under reinforce 17 is provided with a vertical wall portion 17J which oppose a front wall portion 38A of a center floor cross member 38.

Figure 12:
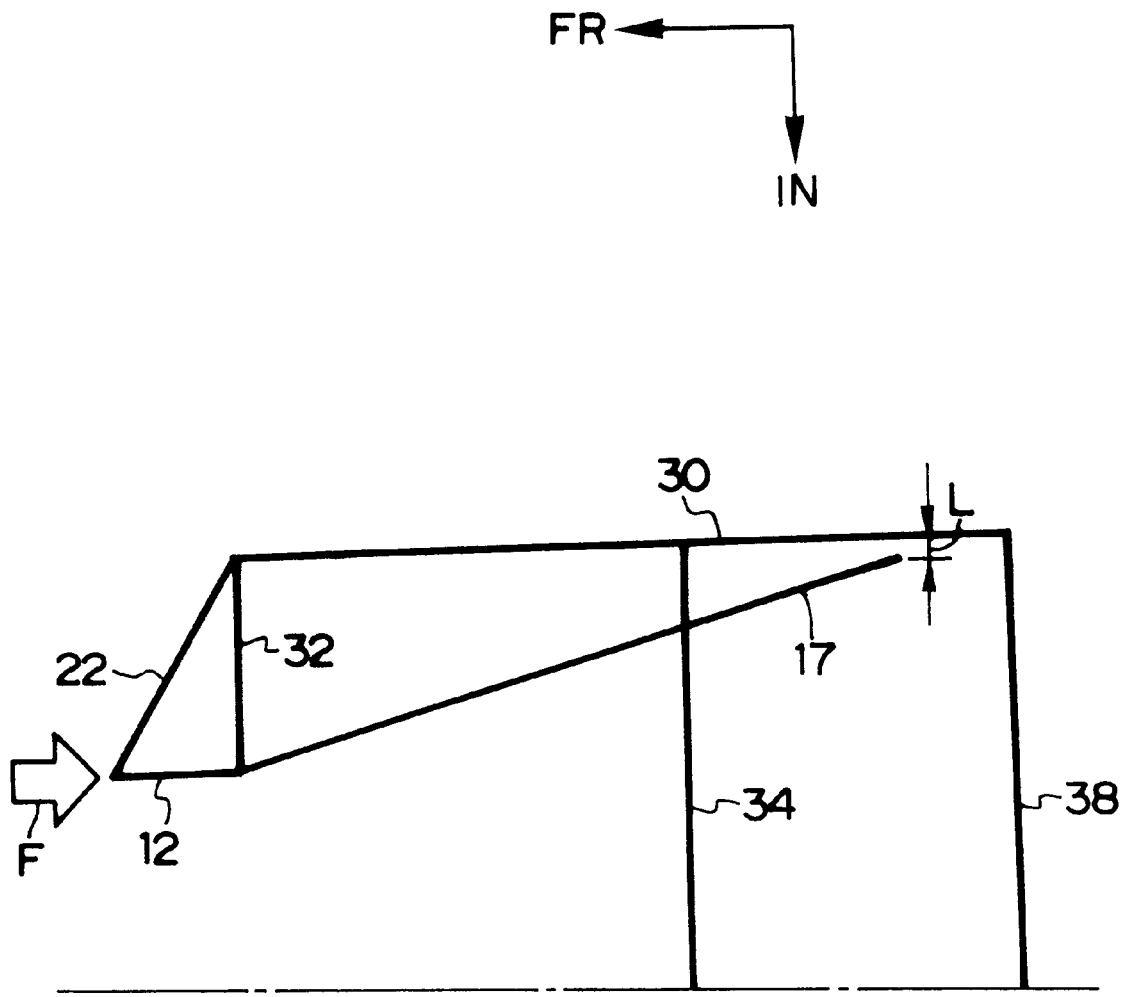
FIG. 12 is a schematic plan view showing the vehicle body structure relating to the third embodiment of the present invention.

Therefore, in the vehicle body structure in this third embodiment, the front side members 12, the under reinforce 17, the pillar brace 22, the side sills 30, the torque box 32, the front floor cross member 34 and the center floor cross member 38 are arranged as shown in FIG. 12.

Next, the operation of the third embodiment of the present invention will be described.

Figure 13:
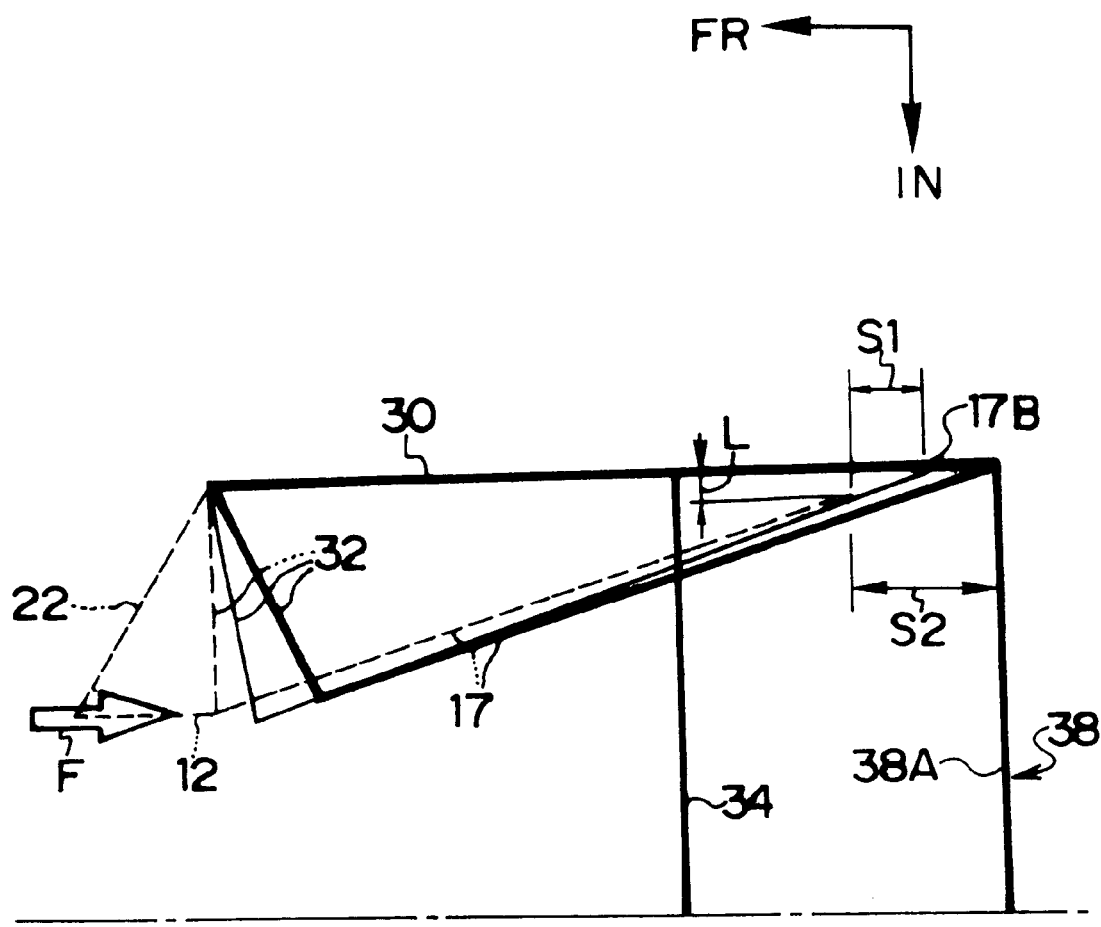
FIG. 13 is an operational view for explaining the vehicle body structure relating to the third embodiment of the present invention.

As shown in FIG. 13, in this third embodiment, when an impact force (an arrow F in FIG. 7) is applied to the front side members 12 toward the rear of the vehicle at the time of a collision, the under reinforce 17 is pushed by the front side members 12, so that the under reinforce 17 is deformed toward the rear of the vehicle and outwardly in the transverse direction of the vehicle from the position of a broken line to the position of a thin solid line in FIG. 13 (the deformation amount toward the rear of the vehicle is S1). In addition, the rear end portion 17B of the under reinforce 17 abuts the side sill 30, and supported by the side sill 30.

In the case that an input load F at the time of the collision is further large, the rear end portion 17B of the under reinforce 17 slides toward the rear of the vehicle, while abutting the vehicle transverse direction inner wall portion 30A of the side sill 30, so that the under reinforce 17 is deformed from the position of a broken line to the position of a thick solid line in FIG. 8 (the deformation amount toward the rear of the vehicle is S2). At this time, the vertical wall portion 17J of the rear end portion 17B (see FIG. 11) abuts the front wall portion 38A of the center floor cross member 38 and supported by the front wall portion 38A. In consequence, the absorption of the impact force applied to the front side members 12 can be increased.

Furthermore, in the third embodiment, the rigidity of the supporting of the front floor cross member 34 to the under reinforce 17 and the rigidity of the supporting of the side sill 30 to the under reinforce 17 can be regulated to easily control the deformation amount of the vehicle body and a generated load (a generated yield strength). Further, this effect is particularly effective for short overhang automobiles.

Figure 15:
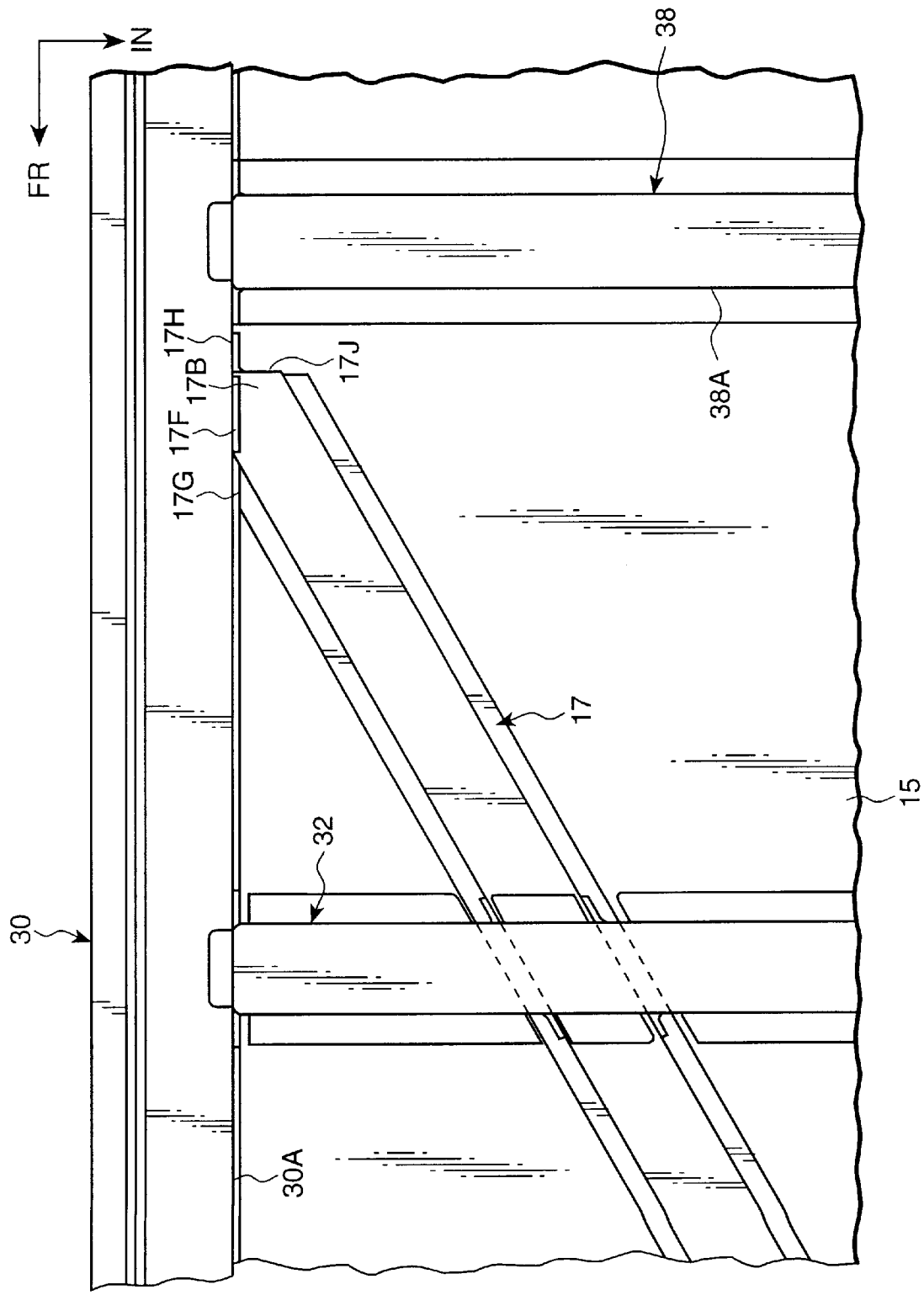
FIG. 15 is a plan view showing the vehicle body structure relating to a modified example of the third embodiment of the present invention.

Moreover, in the third embodiment, the rear end portion 17B of the under reinforce 17 may be disposed with a space of the distance L between the rear end portion 17B and the side sill 30, or the rear end portion 17B of the under reinforce 17 may abut the vehicle transverse direction inner wall portion 30A of the side sill 30, as shown in FIGS. 14 and 15. In the latter case, the rear end portion 17B of the under reinforce 17 is not rigidly fixed to the vehicle transverse direction inner wall portion 30A of the side sill 30.

Figure 16:
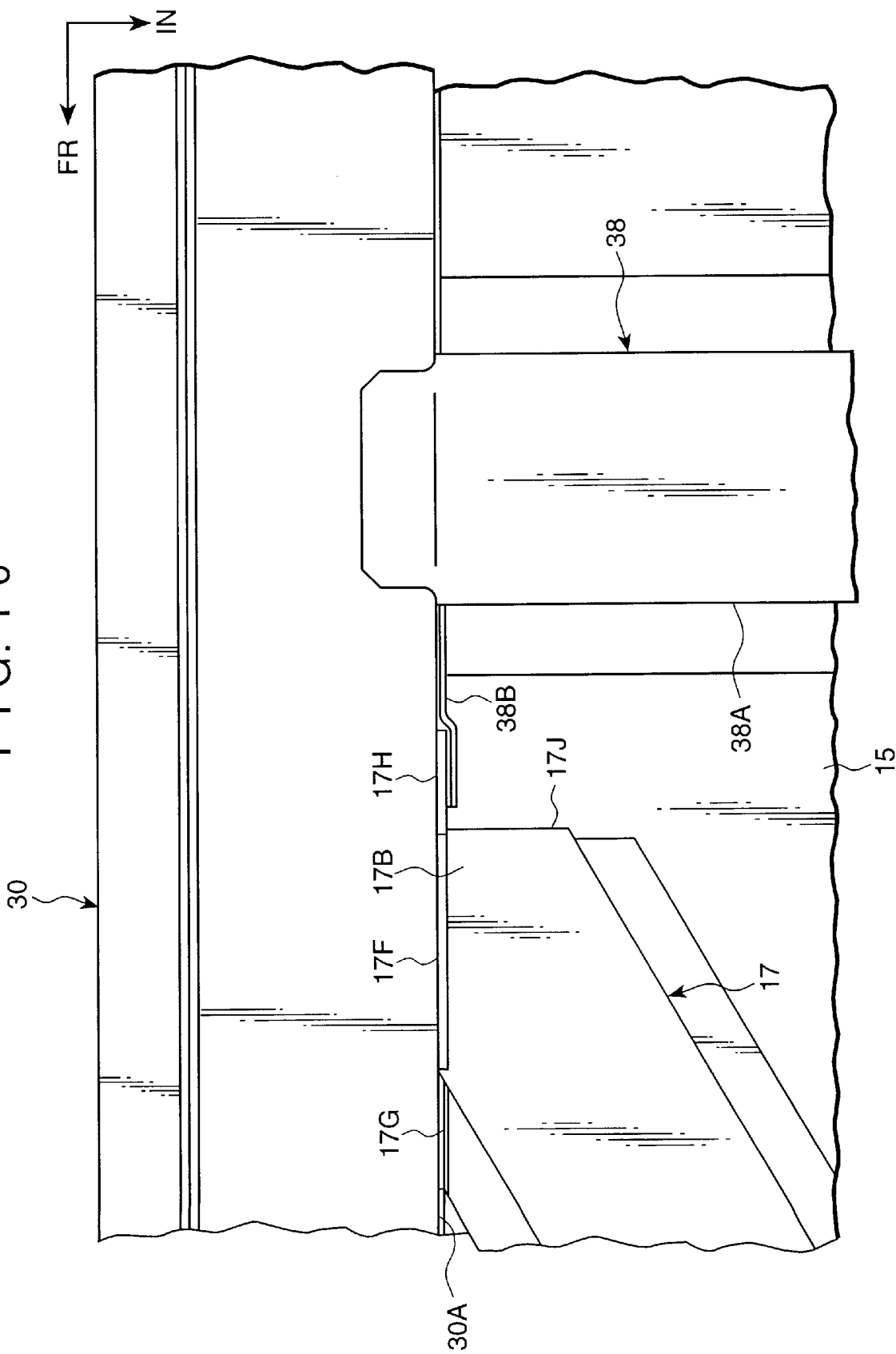
FIG. 16 is a plan view showing the vehicle body structure relating to another modified example of the third embodiment of the present invention.
Figure 17:
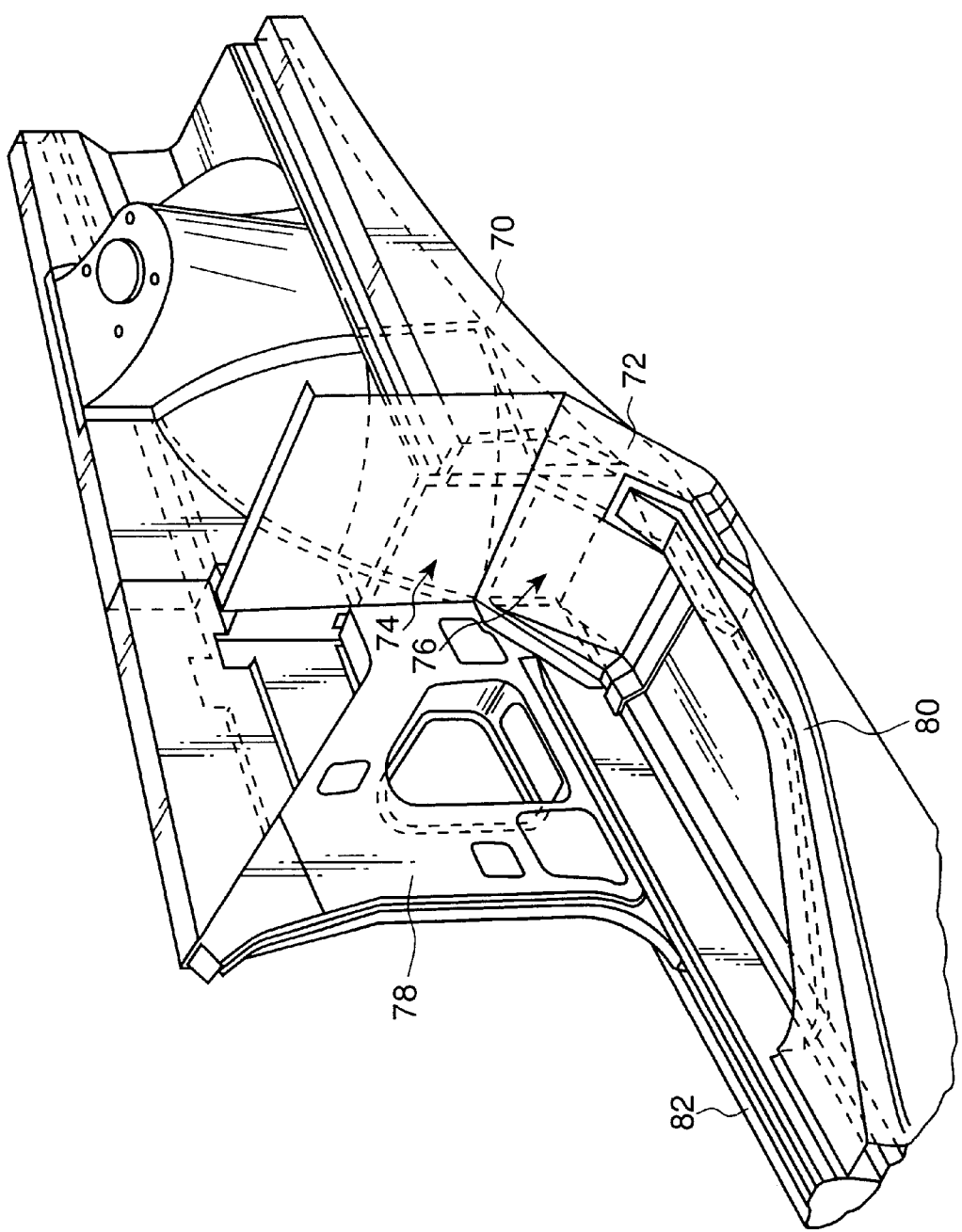
FIG. 17 is a perspective view showing the vehicle body structure relating to a conventional embodiment as seen from interior of the rear portion of the vehicle and at a diagonal.

Furthermore, as shown in FIG. 16, from the vehicle transverse direction outer end portion of the front wall portion 38A of the center floor cross member 38, a front flange 38B formed toward the front of the vehicle may be further extended to the vehicle front so as to superpose and fix the front flange 38B on a rear flange 17H of the under reinforce 17 along the vehicle transverse direction. In this case, the under reinforce 17 and the center floor cross member 38 are fixed to each other by the spot welding of the flange 17H and the flange 38B, whereby a larger deformation strength can be obtained at the time of the deformation. In addition, the rear flange 17H of the under reinforce 17, the front flange 38B of the center floor cross member 38 and the side sill 30 are subjected to the spot welding, whereby the number of weld points can be reduced as compared with a case in which the rear flange 17H and the side sill 30 are spot welded and the front flange 38B and the side sill 30 are spot welded.

The present invention has been described above in detail in accordance with specific embodiments, but the scope of the present invention should not be limited to these embodiments. It should be apparent to a person skilled in the art that various practical modifications are possible within the scope of the present invention.

What is claimed is:

1. A vehicle body structure for absorbing a load applied to a front of a vehicle, said vehicle having a first side sill extending along a longitudinal direction of the vehicle and a floor panel, said vehicle body structure comprising:

a reinforcing member fixed to the floor panel of the vehicle, said reinforcing member being positioned inwardly of said first side sill and extending rearwardly and transversely toward said first side sill, wherein, when said load is applied to the front of the vehicle, a rear end portion of said reinforcing member contacts said first side sill and slidably moves toward a rear of the vehicle.

2. A vehicle body structure according to claim 1, wherein the rear end portion of said reinforcing member is separated from the first side sill at a predetermined distance.

3. A vehicle body structure according to claim 1, further comprising a second side sill, each of said side sills being disposed in a vicinity of respective outside end portions of the vehicle, said vehicle body structure further comprising a front floor cross member connected to said side sills, said front floor cross member being disposed rearwardly of said reinforcing member such that an imaginary line, which extends from said reinforcing member toward the rear of the vehicle along an axial direction of said reinforcing member, intersects said front floor cross member and the first side sill.

4. A vehicle body structure according to claim 3, wherein the rear end portion of said reinforcing member is separated from said front floor cross member by a predetermined distance.

5. A vehicle body structure according to claim 3, wherein the rear end portion of said reinforcing member abuts said front floor cross member.

6. A vehicle body structure according to claim 1, wherein the rear end portion of said reinforcing member abuts the first side sill.

7. A vehicle body structure according to claim 6, further comprising a second side sill, each of said side sills being disposed in a vicinity of respective outside end portions of the vehicle, said vehicle body structure further comprising a front floor cross member connected to said side sills, wherein the rear end portion of said reinforcing member includes a first flange and wherein each end portion of said front floor cross member includes a second flange, wherein each of said flanges is fixed integrally to one of said side sills.

8. A vehicle body structure according to claim 1, further comprising a second side sill, each of said side sills being disposed in a vicinity of respective outside end portions of the vehicle, said vehicle body structure further comprising a front floor cross member connected to said side sills, wherein said reinforcing member passes through said front floor cross member such that an imaginary line, which extends from said reinforcing member toward the rear of the vehicle along an axial direction of said reinforcing member, intersects the first side sill.

9. A vehicle body structure according to claim 8, wherein the rear end portion of said reinforcing ember is separated from the first side sill by a predetermined distance.

10. A vehicle body structure according to claim 8, wherein the rear end portion of said reinforcing member abuts the first side sill.

11. A vehicle body structure according to claim 8, further comprising a center floor cross member connected to said side sills, wherein the rear end portion of said reinforcing ember has a first flange and each end portion of said center floor cross member has a second flange, wherein each of said flanges is fixed integrally to one of said side sills.

* * * * *